Dec. 21, 1965  G. LUGLI  3,224,481

TREAD RINGS FOR REMOVABLE-TREAD TIRES

Filed Sept. 23, 1963

INVENTOR
Giuseppe Lugli

BY Stevens, Davis, Miller & Mosher
ATTORNEYS

United States Patent Office 3,224,481
Patented Dec. 21, 1965

3,224,481
TREAD RINGS FOR REMOVABLE-TREAD TIRES
Giuseppe Lugli, Milan, Italy, assignor to
Pirelli S.p.A., Milan, Italy
Filed Sept. 23, 1963, Ser. No. 310,760
Claims priority, application Italy, Oct. 4, 1962,
19,576/62
5 Claims. (Cl. 152—176)

The present invention relates to pneumatic tires of the "replaceable tread" type which are conventionally provided with a carcass upon which a removable tread ring is mounted.

In pneumatic tires of this type the tread is secured to the carcass by the friction forces which develop between the two parts when the tire is inflated. To assure this result, the tread ring is provided with an inextensible inner reinforcement of a width substantially equal to that of the ring, thus rendering the ring inextensible in the circumferential direction. The inner diameter of the reinforcement is less than the outer diameter which the carcass would assume if it were inflated devoid of the tread ring.

However, such tread rings, it has been found, are subjected to at least two kinds of problems, both of which are caused by a plastic condition that sometimes develops in the rubber compound underlying the cords of the reinforcement.

One such condition occurs at the beginning of the molding of the ring, wherein the forces acting on the cords of the inextensible reinforcement are often such as to make punctures at various points of the underlying rubber compound layer. The punctures cause the cords of the reinforcement to protrude irregularly through the inner surface of the ring (which gives rise during service to a premature wear of the carcass and, in case of metallic cords, even to oxidation phenomena). Such punctures also lead to irregularities in the geometrical position of the cords of the reinforcement of the ring so that the cords are no longer disposed on a regular and smooth cylindrical surface.

The other objectionable condition on occasions occur during the working of the tire, when the high temperatures which are reached in some points can bring the compound, though it is cured, to such a plastic condition as to be punctured by part of the cord.

These inconveniences are more frequent in tread rings provided with a reinforcement constituted of longitudinal or substantially longitudinal cords and are particularly noticeable in the marginal portions of the reinforcement itself.

The aim of the present invention is to provide a tread ring for pneumatic tires of the replaceable tread type free of the aforesaid problems wherein the reinforcing cords of the tread will be regularly disposed on a cylindrical surface even in the marginal portions.

Briefly summarized, the present invention embodies a tread ring of the type heretofore described provided with an inextensible reinforcement of a width substantially equal to that of the ring and constituted by cords disposed in a substantially longitudinal direction, wherein, at least in the marginal portions of the tread and radially inwardly of the reinforcement, there is disposed at least one protective layer of cords parallel to each other and forming an angle greater than 30° with respect to the mid-circumferential plane of the tire.

This protective layer disposed inside the reinforcement distributes on a larger surface the stress localized on a single cord of the reinforcement, thus preventing the undesirable puncturing of the underlying compound described above. Furthermore this internal layer cooperates in maintaining a regular distribution of the reinforcing cords, as it serves to connect the adjacent cords, thus limiting the freedom of movement between them. In this way the inner layer provides a highly satisfactory solution to the above stated problems.

The inner layer may be constituted of metallic cords, or of cords made of cotton, rayon, nylon, or other organic textile material. However, the layer should not be so stiff that the distribution of the pressures between the tread ring and the carcass might be modified. For this reason it is preferable that the layer be constituted by cords made of an organic textile material such as rayon, nylon, and cotton.

The cords of the inner layer may form with respect to the circumferential direction any angle greater than 0°. However, the greater the angle, the more effective is the layer, so that it is advisable to select an angle no less than 30° and, according to a preferred embodiment of the invention, the cords should be disposed at 90° with respect to the circumferential direction.

A plurality of inner layers may be utilized, but it has been ascertained in the practice that, for most cases, a single layer is sufficient.

Generally the width of the inner layer is coextensive with the width of the tread. However, since the marginal portions of the inextensible reinforcement are the portions most likely to be subjected to the problems previously described herein, a less expensive solution can be adopted, which consists in disposing inside the inextensible reinforcement two strips of substantially reduced width, one for each edge of the reinforcement, instead of a single layer.

Another alternative utilizes a layer of a width equal to that of the tread in addition to two strips limited to the marginal portions, one for each edge. In this form it is preferable that the cords of the marginal strips be angularly disposed with respect to the cords of the wider single layer.

The invention may be better understood by reference to the accompanying drawings, and following detailed description with regard to the drawings, wherein.

Figure 1:
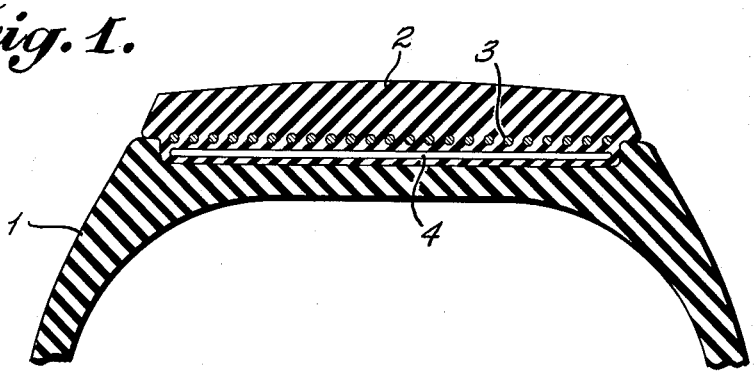
FIG. 1 is a fragmentary cross-sectional view of a pneumatic tire of the replaceable tread type according to one embodiment of the present invention.

In the drawings corresponding reference numerals refer to corresponding parts of the tire. Reference numeral 1 indicates the carrying carcass. The tread ring is designated by reference numeral 2 and the annular reinforcement of the ring is indicated by the numeral 3. In the several embodiments the reinforcement 3, by way of example, is illustrated in the drawings as being constituted by a single layer of longitudinal metallic cords.

In the embodiment as illustrated by FIG. 1, radially inwardly of the annular reinforcement 3 there is an annular layer 4 constituted by cords composed of an organic textile material, such as rayon, which cords are disposed in a direction perpendicular to the direction of the cords of the reinforcement 3.

Figure 2:
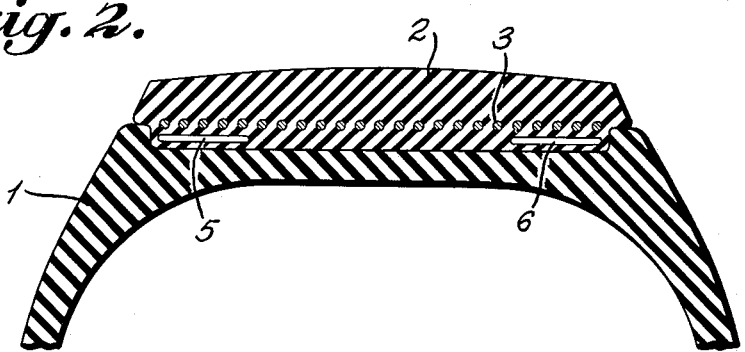
FIG. 2 is a similar view of another embodiment of the invention.

FIG. 2 illustrates a more economical solution, whereby radially inwardly of the reinforcement 3, there are two annular strips 5 and 6, each disposed beneath a marginal edge portion of the reinforcement constituted by cords of an organic textile material disposed in a transverse direction.

Figure 3:
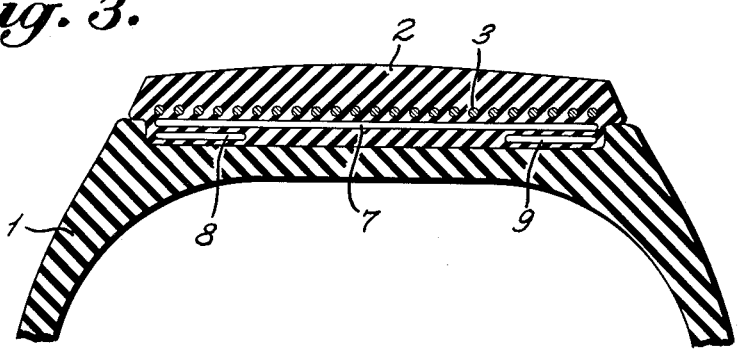
FIG. 3 is also a cross-sectional view of a further embodiment of the present invention.

FIG. 3 illustrates another alternative solution according to which radially inwardly of the reinforcement 3 there are an annular layer 7 and two annular strips 8 and 9, one below each marginal edge portion of the reinforcement. Both the layer 7 and the strips 8 and 9 are constituted by cords of an organic textile material. The cords of the layer 7 are disposed in a transverse direction; specifically, at 90° with respect to the mid-circumferential plane of the tire, whereas the cords of the strip 8 and 9 form with this plane an angle of 70°.

It should be understood that the above described embodiments are disclosed by way of example and that the present invention includes any other alternative embodiments which may be utilized by those having ordinary skill in the art. For instance the layers of the strips of cords disposed radially inwardly of the inextensible reinforcement may be layers of rubber in which pieces of more or less long filaments of a metallic material or of an organic textile material are dispersed.

Also, in the various embodiments herein described, two or more superposed layers may be used in place of any layer shown and described.

What is claimed as new is:

1. In a replaceable tread ring adapted to be detachably mounted upon the carcass of a pneumatic tire, a reinforcement consisting of a plurality of continuous inextensible cords, each of said inextensible cords being disposed in a substantially longitudinal direction, said reinforcement being of a width substantially equal to the width of said tread ring, and at least one annular layer of protective cords extending substantially parallel to each other at an angle of no less than 30° relative to the mid-circumferential plane of the tire, said layer of protective cords being disposed radially inwardly of said reinforcement and being of a width coextensive with the width of said reinforcement, and said layer of protective cords being of such flexibility to avoid modifying the pressure distribution between said tread ring and the carcass.

2. The combination defined by claim 1, said protective cords being composed of an organic textile material.

3. The combination defined in claim 1, wherein said protective cords extend at an angle ranging from 30° to 90° relative to said mid-circumferential plane.

4. The combination defined by claim 1, wherein the protective cords extend at an angle of 90° relative to the mid-circumferential plane.

5. In a replaceable tread ring adapted to be detachably mounted upon the carcass of a pneumatic tire, a reinforcement consisting of a plurality of continuous inextensible cords, each of said inextensible cords being disposed in a substantially longitudinal direction, said reinforcement being of a width substantially equal to the width of said tread ring, and a pair of generally horizontally spaced strips each having a plurality of protective cords, each of said protective cords extending in a generally transversal direction relative to the mid-circumferential plane of the tire, said strips being disposed radially inwardly of said reinforcment, and the outer marginal edges of said strips being substantially coextensive with the adjacent marginal edge of said reinforcement, and said strips being of such flexibility to avoid modifying the pressure distribution between said tread ring and the carcass.

References Cited by the Examiner

UNITED STATES PATENTS

| 1,234,193 | 7/1917 | Mass | 152—176 |
| 2,947,339 | 8/1960 | Billingsley | 152—361 |
| 2,985,214 | 5/1961 | Lugli | 152—176 |
| 2,990,867 | 7/1961 | Barassi | 152—176 |

FOREIGN PATENTS

| 1,214,031 | 11/1959 | France. |
| 1,253,395 | 12/1959 | France. |

ARTHUR L. LA POINT, *Primary Examiner.*